United States Patent [19]

Kablaoui et al.

[11] 3,957,660
[45] May 18, 1976

[54] DRILLING FLUID

[75] Inventors: Mahmoud S. Kablaoui; Jack H. Kolaian, both of Wappingers Falls, N.Y.

[73] Assignee: Texaco Inc., New York, N.Y.

[22] Filed: June 27, 1974

[21] Appl. No.: 483,597

[52] U.S. Cl. ............................. 252/8.5 C; 252/353
[51] Int. Cl.² ............................................. C09K 7/02
[58] Field of Search ...................... 252/8.5 C, 353

[56] References Cited
UNITED STATES PATENTS

| | | | |
|---|---|---|---|
| 3,558,487 | 1/1971 | Stratton | 252/8.5 |
| 3,586,628 | 6/1971 | Kolaian | 252/8.5 |
| 3,631,227 | 12/1971 | Kablaoui et al. | 260/479 R |

OTHER PUBLICATIONS

Tishchenko et al., Article in Journal of Applied Chemistry of The U.S.S.R., Vol. 35, No. 3, Mar. 1962, pp. 611–619.

*Primary Examiner*—Herbert B. Guynn
*Attorney, Agent, or Firm*—T. H. Whaley; C. G. Ries; James F. Young

[57] ABSTRACT

An aqueous drilling fluid dispersant and a method of drilling wells using as the drilling fluid dispersant a sulfonated mixture of catechol, chlorophenol and phenol, as hereinafter more fully defined.

4 Claims, No Drawings

DRILLING FLUID

This invention relates to a novel aqueous drilling fluid for drilling wells through sub-surface formations by means of well drilling tools, and particularly to such an aqueous well drilling fluid having improved dispersibility as a result of containing therein a novel dispersant as hereinafter more fully described. The invention is also concerned with a method of drilling wells employing the novel aqueous drilling fluid.

Drilling fluids, or muds as they are sometimes called, are slurries of clayey solids used in the drilling of wells for tapping underground collections of oil, gas, brine or water. Such fluids have a number of different functions, the most important of which are to assist in the removal of cuttings from the well, to seal off formations of gas, oil or water which may be encountered at different levels, to lubricate the drilling tool and drill pipe which carries the tool, and to hold the cuttings in suspension in event of shut-downs in drilling.

An ideal drilling fluid is a thixotropic colloidal system, i.e., a fluid which on agitation or circulation (as by pumping or otherwise), has a measurable relatively low viscosity and is free flowing (not plastic), particularly at high temperatures; but when such agitation or circulation is halted, the fluid sets or gels. The rate of gel formation is such as to permit the cuttings to fall only a short distance before the gel structure is sufficiently strong to support them.

When such a drilling fluid having the proper viscosity, the proper gel rate and proper gel strength is circulated through a well bore, it has a sufficiently high viscosity to carry the cuttings and sand from the bottom of the surface and it hole to the surface a gel rate such as to allow the cuttings and sand to settle in a settling pit. On standing in a quiescent state, it develops sufficient gel strength to prevent the settling of the cuttings, sand or weighting material, etc., in the well bore when it becomes necessary to discontinue circulation for any appreciable period of time. Such a fluid is also characterized by its ability to form a mud cake on the borehole wall, thereby assisting in sealing off the traversed formations and inhibiting so-called water loss, i.e., loss of water from the drilling fluid.

One of the principal problems in mud chemistry is the production of suitable drilling fluids having satisfactory dispersibility, and the necessary thixotropic properties discussed above.

In accordance with the present invention the problems of dispersibility in aqueous drilling fluids can be solved by incorporating in an aqueous drilling fluid as the dispersant a sulfonated mixture of catechol, chlorophenol and phenol, as hereinafter more fully defined and will be referred to as the "sulfonated mixture of the present invention".

It is known from the article appearing in Zhur. Priklad. Khem. 35, pages 636–647 (1962), "Organic Viscosity Reducers in Clay Solutions" by D. Tischenko and S. Fleisher (CA, 57, 2491g, 1962), that the ortho-dihydroxybenzenesulfonic acids, the ortho-dihydroxyalpha-toluenesulfonic acids and water soluble salts thereof are viscosity reducing agents in clay laden drilling fluids whereas the corresponding meta- and para-dihydroxybenzenes including the corresponding sulfonic acid derivatives and water soluble salts thereof are ineffective viscosity reducing agents for aqueous drilling fluids.

It is also known from U.S. Pat. No. 3,558,487 that sulfonated polyhydric phenols capable of being oxidized to a quinone such as 2, 3-dihydroxybenzene sulfonic acid, 3,4,-dihydroxybenzenesulfonic acid, 2, 5-dihydroxybenzenesulfonic acid, 2,5-dihydroxy-1, 3, 4-benzenetrisulfonic acid, the sodium salt of 4, 5-dihydroxy-m-benzenedisulfonic acid, potassium salt of 2, 5-dihydroxy-benzenesulfonic acid, sodium salt of 3, 5-disulfo-o-benzoquinone, the semiquinone radical obtainable on the oxidation of 2, 5-dihydroxy-benzenesulfonic acid and the corresponding sodium salt thereof are satisfactory drilling fluid dispersants.

The sulfonated mixture of the present invention is prepared in the following manner:

The starting material, an admixture of about 70% catechol, 10% o-chlorophenol and 5% phenol, and also containing about 15% undistillable and unidentifiable material, on a weight basis, is sulfonated using concentrated $H_2SO_4$ or $SO_3$ to effect sulfonation, then followed by treatment with caustic to form the corresponding sodium salts.

The crude admixture of starting materials is obtained in the preparation of catechol diacetate by the method of U.S. Pat. No. 3,631,227 from cyclohexanol or cyclohexanone or both.

The disclosure of this patent is incorporated herein by reference. It is surprising that such a sulfonated mixture, containing only about 75% of active dispersant material, (excluding the phenol sulfonate and undistillable material) is capable of showing dispersing activity about the same as 4-methyl catechol, known to be an excellent dispersant.

Following is a description for the preparation of the reaction mixture for sulfonation.

A mixture of cyclohexanol (13 grams, 0.13 mole) and cyclohexanone (7 grams, 0.07 mole) was chlorinated in 100 mls. of water and 3 mls. of concentrated hydrochloric acid with chlorine gas (28 grams, 0.39 mole) at 20°C. to give 25.5 grams (96 wt. percent yield) of 2-chlorocyclohexanone. The residue was further chlorinated with chlorine gas (15 grams, 0.21 mole) at 20°C. in 75 mls. of acetic acid to give 31.2 grams of dichlorocyclohexanone representing a 95 wt. percent yield and consisting of 2,2-dichloro (81 wt. percent) and 2,6-dichlorocyclohexanone (19 wt. percent).

The above chlorinated residue was charged to a dropping funnel connected to a flask equipped with a condenser, thermometer and gas inlet tube containing 100 mls. of acetic anhydride, 100 mls of acetic acid and an acylation catalyst consisting of 5 mls. of boron trifluoride etherate. The solution in the flask was refluxed under nitrogen and the solution in the dropping funnel was added slowly. Reflux was continued for one hr. The reaction mixture was cooled to about 10°C and 19 gms. of concentrated sulfuric acid was added slowly and the reaction mixture was refluxed for 2 hours. The residue was then cooled and quenched in 200 mls. of ice water and extracted with 200 mls. of ether. The ether layer was washed with 100 mls. of 7% by weight aqueous sodium bicarbonate and dried. The residue, 17.6 gms. consisted of 10.8 grams of catechol diacetate, 2.2 grams of o-chlorophenylacetate, 2.0 grams of phenyl acetate and 2.6 g of unidentifiable material, was hydrolyzed in 200 ml. of 10% hydrochloric acid solution by refluxing for 3 hours. Work-up as above gave 10.8 grams of residue, consisting of about 62% catechol, 11% phenol, 12% o-chlorophenol and 15% of undistillable, unidentified material.

Into a 3-neck flask equipped with a mechanical stirrer, condenser and a thermometer was charged 100 g. of 96% $H_2SO_4$. The solution was cooled to 10°–20°C. and there was added this residue, (catechol, phenol, chlorophenol and undistillable and unidentifiable material.) The flask was heated to a temperature of 90°C. for 3–5 minutes, cooled and then added to a 15% by weight solution of NaOH in ice. The resulting mixture was evaporated to dryness and the solid residue remaining was extracted twice with hot methanol to give 18.0 g. of the sodium salts of the sulfonated product, consisting of catechol disulfonate, phenol monosulfate, chlorophenolmonosulfonate and the undistillable and unidentified material.

The mixture of dichlorocyclohexanone can also be prepared by the reaction of 19.0 g of cyclohexanone and 28.0 g of chlorine gas in 75 ml. of acetic acid at 20°C.

The sulfonated mixture of the present invention may be added to an aqueous drilling fluid in amounts ranging from about 0.1 pound to about 10 pounds per barrel of drilling fluid. In general, it has been found that amounts less than 0.1 pound per barrel do not produce completely satisfactory results in terms of dispersing activity whereas amounts above about 10 pounds per barrel are economically unattractive and no improved results are obtained therewith. A preferred range for the sulfonated mixture of the present invention is from about 0.25 to about 7 pounds per barrel of drilling fluid for most consistent results and efficiency.

Yield Point (YP) is calculated by substracting the Plastic Viscosity (PV) from the Fann Viscosity reading at 300 rpm. Plastic Viscosity (PV) is obtained by calculation, subtracting the Fann reading at 300 rpm from the 700 rpm reading. Apparent Viscosity (AV) is equal to one half of the Fann Viscosity reading obtained at 600 rpm. The fluidity of a mud can be back calculated from these data, the results being expressed in Fann Viscosity at 600 rpm and 300 rpm for a direct reading viscosimeter.

The properties of the base muds are shown in the table.

Representative physical properties of the drilling fluids both before and after addition of the sulfonated mixture of the present invention are shown in the table. In each example the amount of material or materials added to the base mud, if any, is shown, expressed in terms of pounds of material per barrel of drilling fluid.

TABLE I

| EXAMPLE | AMOUNT OF ADDITIVE lbs/Bbl. | ADDITIONAL ADDITIVE lbs/Bbl. | P V | Y P | pH |
|---|---|---|---|---|---|
| Base Mud[1] | — | — | 8 | 63 | 8.7 |
| Standard* | 0.5 | — | 13 | 18 | 8.4 |
|  | 1.0 | — | 24.5 | 21 | 7.9 |
| 1** | 0.5 | — | 18 | 16 | 9.0 |
| 1 | 1.0 | — | 30 | 23 | 9.1 |
| Standard* | 0.5 | Caustic added to pH 9.5–9.8 | 21.5 | 23 | 9.8 |
|  | 1.0 |  | 26 | 31.5 | 9.7 |
| 1 | 0.5 | " | 21.5 | 33.5 | 9.5 |
|  | 1.0 | " | 18.5 | 17 | 9.6 |

[1]A low pH stock mud obtained from a drilling site in Louisiana.
*4-methyl 1,2-dihydroxybenzene
**Sulfonated mixture of this invention

TABLE II

| EX- AMPLE | AMOUNT OF ADDITIVE lbs/Bbl. | ADDITIONAL ADDITIVE lbs/Bbl. | THERMAL STABILITY TEMP. | P V | Y P |
|---|---|---|---|---|---|
| Base Mud[1] | — | — |  | 8 | 63 |
| Standard* | 1 | — | Room | 23.5 | 7.5 |
|  |  |  | 350°F | 0 | 182 |
|  |  |  | 1 hr. at 350°F | — | — |
|  |  |  | cool to Room | 28.5 | 20.5 |
| 1** | 1 |  | Room | 22 | 4 |
|  |  |  | 350°F | 4 | 112 |
|  |  |  | 1 hr. at 350°F | 2 | 91 |
|  |  |  | cool to Room | 30.5 | 12.5 |
| Standard* | 1 | Caustic to adjust pH 9.5–9.8 | Room | 28.5 | 7 |
|  |  |  | 350°F | — | — |
|  |  |  | 1 hr. at 350°F | 0 | 146 |
|  |  |  | cool to Room | 32.5 | 25.5 |
| 1** | 1 | " | Room | 32.5 | 11.5 |
|  |  |  | 350°F | 0 | 215 |
|  |  |  | 1 hr. at 350°F | 0 | 212.5 |
|  |  |  | cool to Room | 41 | 20 |

[1]A low pH stock mud - same as in Table I.
*Standard - 4-methyl-1,2-dihydroxytoluene.
**Sulfonated mixture of this invention.

The data in the above tables show that the sulfonated reaction mixture of the present invention is equal to or superior to one of the preferred drilling fluid dispersants, o-dihydroxytoluene (4-methyl-1, 2-dihydroxybenzene) disclosed are claimed in U.S. Pat. No. 3,586,628.

In particular, the sulfonated mixture is superior in dispersing actively in a low pH mud system with caustic added to adjust the pH of the mud, and is superior in its dispersing capability in the thermal stability tests.

This uniqueness of the sulfonated mixture is surprising in these tests, since it does not show good dispersing properties in a Shale Control Mud environment. In fact it is a generally unsatisfactory material in such a mud system.

Moreover, the sulfonated mixture is unsatisfactory in the presence of contaminating amounts of salt, such as about 5 to 10 pounds of salt per barrel of drilling fluid. Similarly, the standard 4-methyl-1, 2-dihydroxybenzene is salt sensitive at these salt concentrations.

We claim:

1. An aqueous drilling fluid consisting essentially of water, clay solids and as the dispersant from about 0.1 to about 10 pounds per barrel of drilling fluid of a sulfonated reaction product mixture consisting essentially of about 50–70% of catechol disulfonate, 10–15% of chlorophenol sulfonate, 5–15% of phenol sulfonate, the balance comprising about 15–20% of undistillable and unidentifiable material, on a weight basis, said sulfonated reaction product mixture being obtained by chlorinating a mixture of cyclohexanol and cyclohexanone to form a reaction mixture of 2,2-dichloro and 2,6-dichlorohexanone, reacting said resulting reaction mixture with acetic anhydride, acetic acid and boron trifluoride etherate as a catalyst under refluxing conditions, adding concentrated sulfuric acid thereto, and continuing said refluxing, cooling the resulting refluxed reaction mixture, recovering an admixture of catechol diacetate, o-chlorophenyldiacetate, phenyl acetate and an unidentifiable material, hydrolzing said recovered admixture to form a mixture of catechol, phenol, o-chlorophenol and undistillable unidentified material, sulfonating said recovered hydrolyzed mixture, and recovering therefrom said sulfonated reaction product mixture.

2. An aqueous drilling fluid as claimed in claim 1 wherein said dispersant is present in an amount of from about 0.2 to about 7 pounds per barrel.

3. In a method of drilling wells wherein a drilling fluid is passed through the well in contact with earth formations during the drilling operation, the improvement which comprises contacting said earth formations with an aqueous drilling fluid consisting essentially of water, clay solids and as the dispersant from about 0.1 to about 10 pounds per barrel of drilling fluid of a sulfonated reaction product mixture consisting essentially of about 50–70% of catechol disulfonate, 10–15% of chlorophenolsulfonate, 5–15% of phenol sulfonate, the balance comprising about 15–20% of undistillable, unidentified material, on a weight basis, said sulfonated reaction product mixture bing obtained by chlorinating a mixture of cyclohexanol and cyclohexanone to form a reaction mixture of 2,2-dichloro and 2,6-dichlorohexanone, reacting said resulting reaction mixture with acetic anhydride, acetic acid and boron trifluoride etherate as a catalyst under refluxing conditions, adding concentrated sulfuric acid thereto, and continuing said refluxing, cooling the resulting refluxed reaction mixture, recovering an admixture of catechol diacetate, o-chlorophenyldiacetate, phenol, o-chlorophenol and undistillable unidentified material, sulfonating said recovered hydrolyzed mixture, and recovering therefrom said sulfonated reaction product mixture.

4. A method, as claimed in claim 3, wherein said dispersant is present in an amount of from about 0.2 to about 5 pounds per barrel.

\* \* \* \* \*